United States Patent [19]
Furumiya et al.

[11] Patent Number: 5,636,194
[45] Date of Patent: Jun. 3, 1997

[54] METHOD OF RECORDING AND REPRODUCING DATA ON A DISK

[75] Inventors: Shigeru Furumiya, Katano; Takeshi Nakajima, Osaka; Yoshinari Takemura, Settsu, all of Japan

[73] Assignee: Matsushita Electric Industrial Co., Ltd., Osaka-fu, Japan

[21] Appl. No.: 536,118

[22] Filed: Sep. 29, 1995

Related U.S. Application Data

[62] Division of Ser. No. 222,578, Apr. 4, 1994, Pat. No. 5,490,296.

Foreign Application Priority Data

| Apr. 7, 1993 | [JP] | Japan | 5-80491 |
| Nov. 9, 1993 | [JP] | Japan | 5-279513 |

[51] Int. Cl.$^6$ .................................................. G11B 7/00
[52] U.S. Cl. .............................. 369/59; 369/116; 369/54
[58] Field of Search .......................... 369/32, 116, 59, 369/48, 58, 54, 109, 275.4

[56] References Cited

U.S. PATENT DOCUMENTS

| 4,896,313 | 1/1990 | Hirose et al. | 369/109 |
| 5,235,590 | 8/1993 | Taguchi et al. | 369/124 |
| 5,241,524 | 8/1993 | Lee | 369/58 |
| 5,327,411 | 7/1994 | Iwasa et al. | 369/59 |

FOREIGN PATENT DOCUMENTS 2-165420  6/1990  Japan.

*Primary Examiner*—Nabil Hindi
*Attorney, Agent, or Firm*—Wenderoth, Lind & Ponack

[57] ABSTRACT

In recording data on a rewritable optical disk with a mark edge recording method, the occurrence of edge shift is compensated for. As a first power of a laser beam is greater than a second power, start and termination ends of each mark are produced by irradiation of the first power and a remaining intermediate portion of the mark is produced by irradiating the first and second powers alternately at equal intervals of a predetermined duration which is shorter than a period of a clock pulse. Also, the start and termination ends of the mark are specifically dislocated corresponding to a length of the mark and lengths of two neighbor spaces before and after the mark.

5 Claims, 6 Drawing Sheets

METHOD OF RECORDING AND REPRODUCING DATA ON A DISK

This application is a divisional of allowed application Ser. No. 08/222,578, now U.S. Pat. No. 5,490,296 filed in the U.S. Patent and Trademark Office on Apr. 4, 1994.

BACKGROUND OF THE INVENTION

1. Field of the Inventions

The present invention relates to a method of recording data on an optical rewritable disk using a mark edge recording method and to an apparatus for recording and reproducing the recorded data, and more particularly, to compensation on recording data in order to correctly read recording marks in the form of pulse trains and mark edge positions of a reproduced signal.

2. Description of the Prior Art

One of the advanced disk-shaped recording mediums capable of storing data at high density is known as a phase-change optical disk. Data can be recorded on the phase-change optical disk by irradiating a surface of an optical disk being rotated with a converged laser beam to heat up and melt the irradiated area of a recording layer. A difference of the power of the recording laser beam causes differences of the recording layer in arrival temperature and cooling process, and in turn causes a difference in the physical state or phase, of the recording layer. More specifically, an area irradiated with a high power laser beam becomes high in temperature and then cools down rapidly to become an amorphous phase. On the other hand, an area irradiated with a relatively low power laser beam becomes moderate in temperature and then cools down gradually to become a crystal-line phase. The amorphous area is commonly called as a mark and the crystallized area is called as a space. In recording, binary data is stored in a series of marks and spaces. It is also possible for the phase-change optical disk to erase old data and record new data simultaneously using a single laser beam, or to perform direct overwriting operations.

In reproduction, a lower power laser beam whose power is too low to induce a phase change irradiates the recording layer and its reflected beam is detected. Since the reflectivity is low on the amorphous mark and high on the crystallized space, a difference in the intensity of the reflects beam between the mark and the space is detected to obtain a reproduced signal.

Recording of data on phase-change optical disks is generally carried out by two known methods, a mark position recording method (MPR) and a mark edge recording method (MER). The MPR method records marks of a short, uniform length at different intervals so that the position of the marks correspond to the data. In the MER method, marks of different lengths are recorded at different intervals so that the start and termination edges of each mark correspond to the data. Accordingly, the MER method can generally record at a higher data density than the MPR method. There is generally an edge shift which is a difference of the position of an edge of the reproduced signal from its ideal position. As the edges correspond to the data in the MER method, the edge shift causes an increase in the error rate of the reproduced signal in the MER method. It is thus essential for realization of the high density recording in the MER method to accurately arrange the edges of each mark so as to be at their desired locations.

In the MER method marks having a greater length are recorded as compared with those of the MPR method. However, it is common on the phase-change optical disk for a rear half of each mark to become wide in width in a radial direction due to a heat storage effect of the recording layer when a long mark has been recorded by irradiation of a uniform laser beam. This event will lead to incomplete erasing in direct overwriting or crosstalk between tracks during reproduction, impairing the recording/reproducing characteristics. For preventing the width of the mark from becoming wider in the radial direction in the rear half of the mark, techniques have been introduced in which the power of the laser beam is lessened at the rear half of each mark by controlling the power of the laser beam or the recording pulse width so that the width of the mark is uniform (for example, see Japanese Laid-open Patent Publications Nos. 5-151638 and 3-185628).

There is substantial a disadvantage of those techniques. As described, the marks on a phase-change optical disk are lower in reflectivity of light than the spaces whereby a difference in absorption of the light is created between the marks and the spaces. Also, heat for melting the amorphous phase portion is different from the heat for melting the crystalline phase portion. In direct overwriting, when new data is recorded on an existing mark or space with an equal intensity of laser beam, edges of a new mark are changed in location because of differences in absorbed energy and the arrival temperature. Particularly, when the irradiation of the laser is lowered at the rear half of the mark for the improvement in the shape of the mark during recording, the amorphous phase of the rear half of the mark tends to be unstable, thus producing the edge shift of a termination end of the mark during the direct overwriting.

In addition, three more disadvantages are developed when the marks and the spaces are minimized in size for a high density recording. Firstly, a shorter length of the space produces thermal interference in that heat at the termination end crosses the space to increase temperature of a start end of a succeeding mark and heat at the start end of the succeeding mark affects the cooling process of the termination end of the mark. Such thermal interference causes a change in the location of the edges of the mark. Secondly, since the mark with a shorter length is produced by heating a smaller region of the recording layer as compared with the mark with a longer length, a length of the mark tends to be unproportional to a length of a corresponding signal data to be recorded because of the change of condition of the heat radiation. Hence, the recording conditions based on the marks with the longer length can hardly be implemented with the marks with the shorter length. Thirdly, it is also common that even if the marks and the spaces are recorded at their correct locations on the phase-change optical disk, the positions of the edges of the marks or the spaces with the shorter length are incorrectly reproduced because the frequency characteristic decrease at a high frequency in a reproducing optical system. The frequency characteristics during reproducing may be equalized so as not to cause the edge shift. However, this does not conform to a favorable requirement that the reproduced signal have an improved S/N (signal-to-noise) ratio so as to have less noise. In other words, the edge shift will increase as the S/N ratio is being enhanced.

SUMMARY OF THE INVENTION

It is an object of the present invention to provide a method if recording data on a disk in which a width of each long mark is substantially uniform, and in which an edge shift generated at an termination end of a mark during direct overwriting is minimized, and in which the occurrence of the edge shift caused by thermal interference across a shorter space in recording, the nonlinearity of a short mark, and the equalization characteristics during recording are compensated for. The first power and a second power alternately at equal intervals of a duration which is shorter than a period of a data clock signal in the remaining intermediate portion of the mark, where the first power is higher than the second power. To obtain the third feature, another disk data recording method according to the present invention is provided in which positions of the start and termination ends of each mark are changed according to a length of the mark and lengths of two neighbor spaces before and after the mark.

DESCRIPTION OF THE PREFERRED EMBODIMENTS

An apparatus in accordance with one embodiment of the present invention employs a rewritable phase-change optical disk for recording a digital form of binary data in a mark/space format as assigning its binary bit shift to both edges of a mark. For recording such data on a phase-change optical disk, two different laser beams are used; a first power beam for changing regions of a recording layer to an amorphous phase to create marks and thus termed as a recording power beam, and a second power beam for changing the same to a crystalline phase to erase the marks and termed as an erasing power beam.

Figure 1:
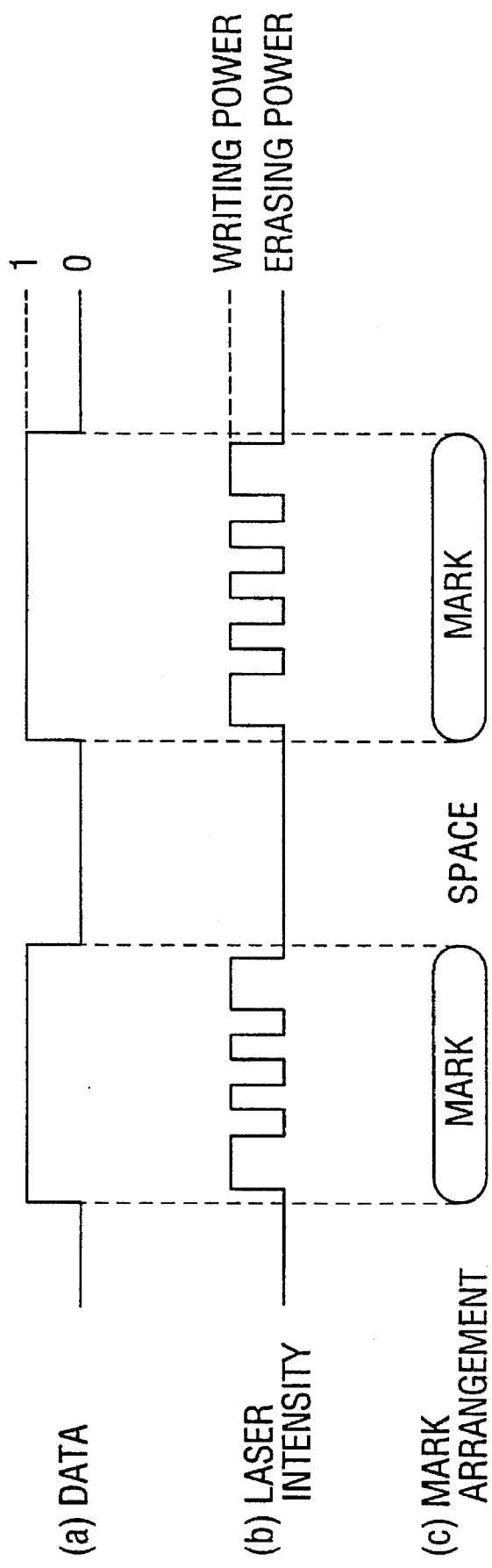
FIG. 1 is a diagram showing a data to be recorded, a laser irradiation intensity, and a arrangement according to a disk data recording method of the present invention.

FIG. 1 shows the data (a) to be recorded, a laser irradiation intensity (b) after relevant compensation, and a mark arrangement (c) produced on a disk, explaining a disk data recording in accordance with the present invention. More specifically, the recording power of the present invention is applied for a predetermined duration to form start and termination ends of each mark respectively without corresponding directly to a waveform of a recording data and two, recording and erasing, powers are alternately irradiated at short intervals to form an intermediate portion of the mark. Accordingly, unwanted overheating at a termination end of the mark is prevented and also, the mark is substantially uniform in width even if it has a considerable length. As the termination end of the mark is sufficiently heated by irradiation of the recording power for the predetermined duration, it will be less affected by the behavior of an existing phase during recording or its edge location will hardly be changed in direct overwriting.

It is desired that an irradiation duration of the recording power for the start and termination ends is equal to a period of a clock signal for ease of implementation. Alteration of the two powers on the intermediate portion of the mark is preferably at equal intervals of a duration which is shorter than the period of the clock signal to prevent a mark width from varying in proportion to the alteration of the two powers. More preferably, an interval of the alteration is one half period of the clock signal as being easily initiated therefrom.

Since the start and termination ends of the mark are recorded corresponding to a length of the mark and lengths of two neighboring spaces before and after the mark, the occurrence of edge shift caused by thermal interference across a shorter space, thermal nonlinearity of a shorter mark, and other reproduction characteristics can be compensated for. The edge shift appears frequently when the length of the mark or a space is smaller than a given value. It is very rare to displace an edge of a mark with a greater length than the given value. Accordingly, the marks to be recorded are correctly effectively implemented by maintaining the start and termination ends of each mark at their locations when its length or a length of any adjacent space is not smaller than the given value and dislocating them when the length or the length of any adjacent space is smaller than the given value. The given value of a limit length may vary depending on a in accordance with data modulation, a structure of the recording layer of the disk, and a recording density. In practice, effective recording is possible by dislocating the position of the start and termination ends of a shortest mark or space in the data to be recorded as well as a second shortest mark or space.

Figure 2:
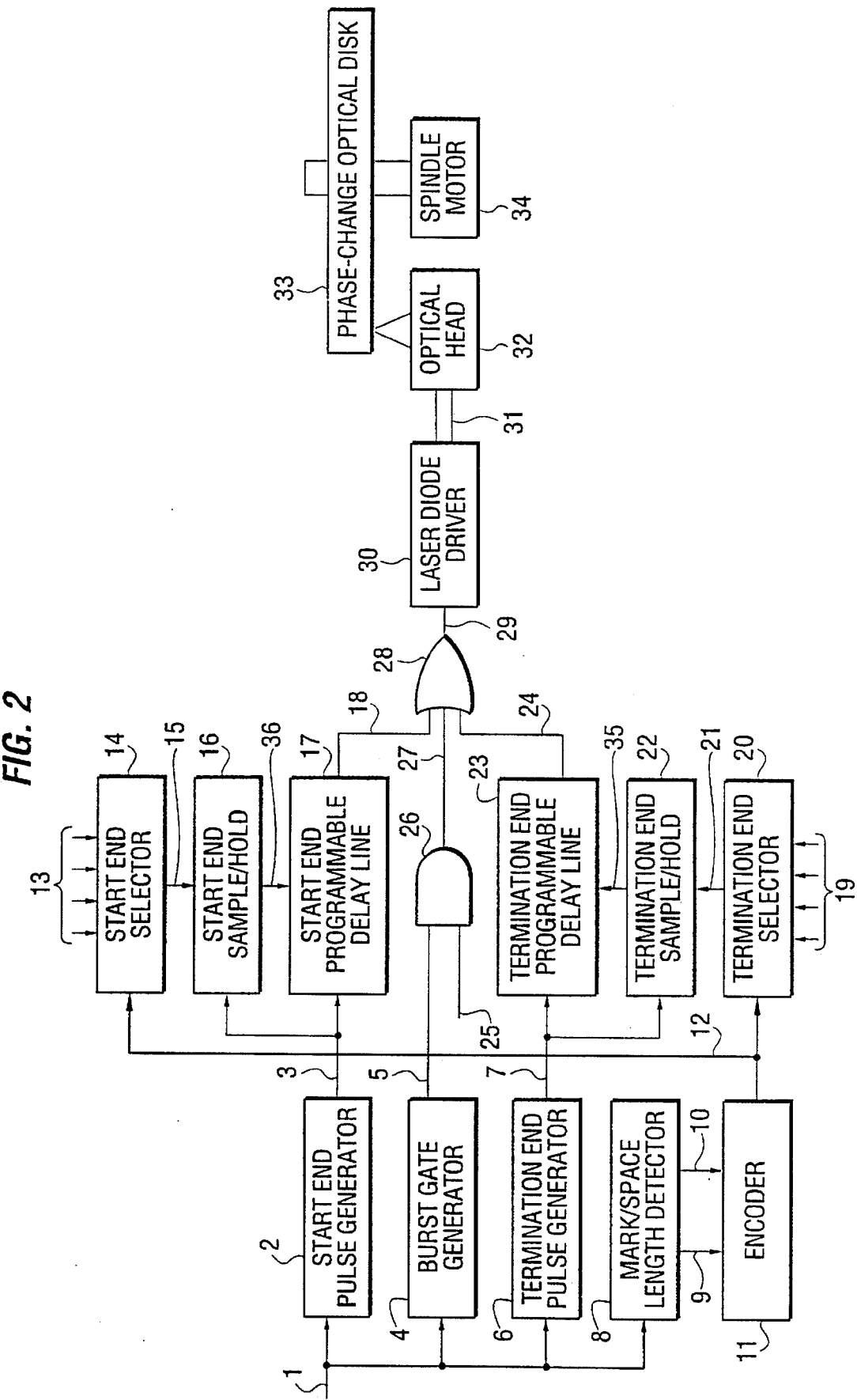
FIG. 2 is a block diagram of a disk data recording apparatus showing one embodiment of the present invention.

A disk recording apparatus in accordance with the present invention is described in detail below referring to relevant drawings. FIG. 2 shows a block diagram of a disk data recording apparatus and FIG. 3 is a waveform diagram of respective signals used in the disk data recording apparatus.

Referring to FIG. 2, data 1 to be recorded, a start end pulse generator circuit 2, a start end pulse 3, a burst gate signal generator circuit 4, a burst gate signal 5, a termination end pulse generator circuit 6, a termination end pulse 7, a mark/space length detector circuit 8, a 2T mark signal 9, a 2T space signal 10, an encoder 11, a select signal 12, start end position data 13, a start end selector 14, a selected start end position data 15, a start end sample/hold circuit 16, a hold start end position data 36, a start end programmable delay line 17, a delayed start end pulse 18, termination end position data 19, a termination end selector 20, a selected termination end position data 21, a termination end sample/hold circuit 22, a hold termination end position data 35, a termination end programmable delay line 23, a delayed termination end pulse 24, a clock signal 25, an AND gate 26, a burst signal 27, an OR gate 28, a recording signal 29, a laser diode driver circuit 30, a laser beam 31, an optical head 32, a phase-change optical disk 33, and a spindle motor 34 are provided.

Figure 3:
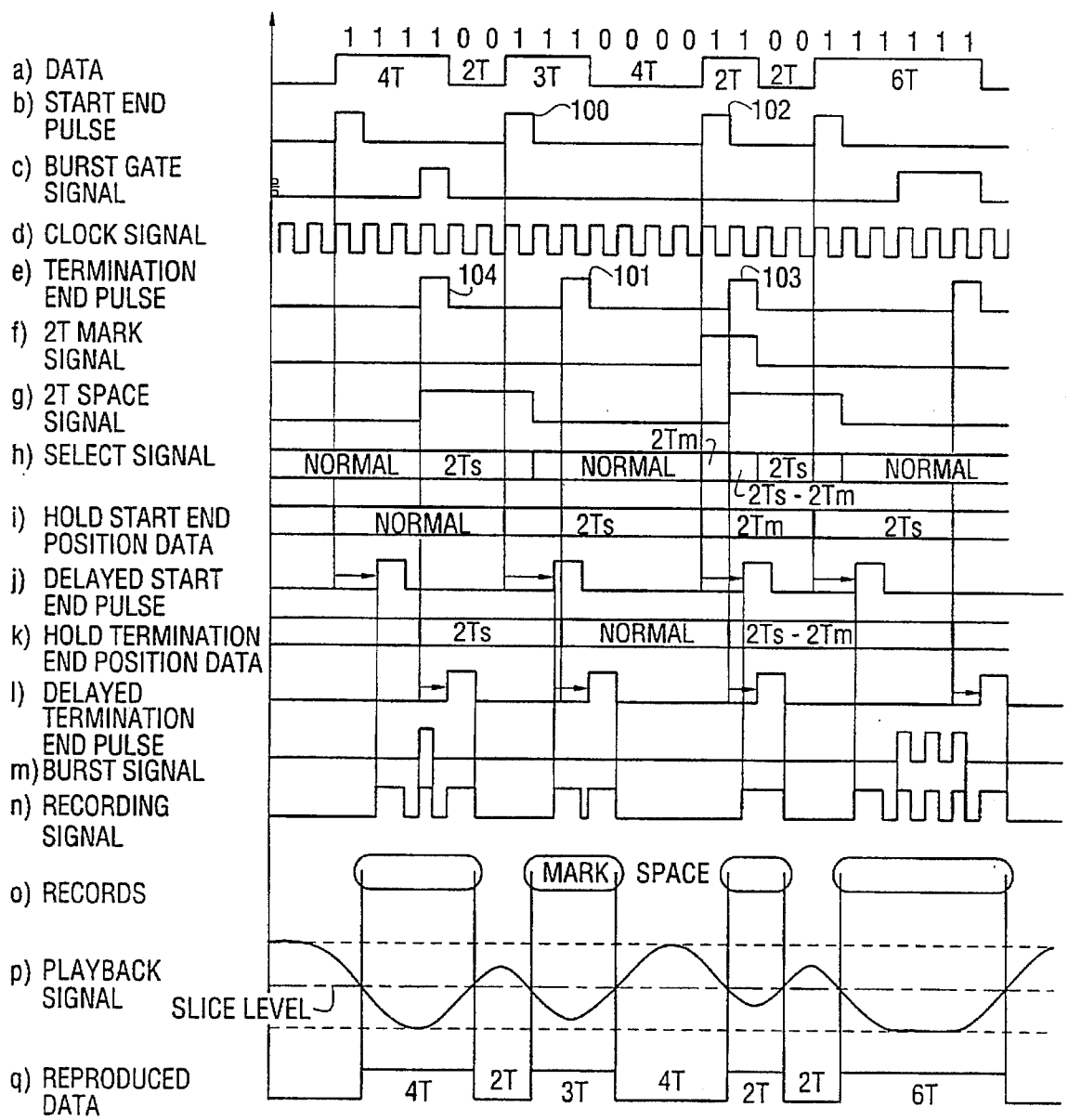
FIG. 3 is a waveform diagram of respective signals explaining the action of the embodiment of the present invention.

As shown in FIG. 3, the letters a to n represent the data 1 to be recorded, the start end pulse 3, the burst gate signal 5, the clock signal 25, the termination end pulse 7, the 2T mark signal 9, the 2T space signal 10, the select signal 12, the hold start end position data 36, the delayed start end pulse 18, the hold training end position data 35, the delayed termination end pulse 24, the burst signal 27, and the recoding signal 29 respectively specified in FIG. 2. Also, denoted by o is a row of marks and spaces recorded on the disk and p is a reproduced signal reproduced by reading the marks and the spaces with a corresponding disk data reproducing apparatus. A reproduced data q is obtained by binarization of the reproduced signal at a slice level.

The operation is described below in more detail referring to FIG. 3. The data 1 is in a digital form comprising a stream of 1s and 0s which are transmitted at a rate of a bit per clock period T with the least unit of two consecutive bits (see a of FIG. 3). The bits of the data 1 are recorded in a form of marks and spaces on an optical disk; 1s allocated to the marks and 0s allocated to the spaces. The start end pulse signal 3 and the termination end pulse signal 7 have a pulse width equal to a clock period. The pulse width of the burst signal 27 is ½ the clock period. The mark/space length detector circuit 8 detects a mark or space which is short enough to induce the edge shift in the high density recording. In this embodiment, the shortest length 2T of the mark or the space in data records is a target to be detected.

The start end pulse generator circuit 2 generates the start end pulse signal 3 of which pulse is assigned to a leading end of each 1-bit group in the data 1 (shown as b). The burst gate signal generator circuit 4 produces the burst gate signal 5 which has a pulse width (equivalent to the length of the mark minus three clock periods) and is assigned to a center of the mark or the 1-bit group (shown as c). Hence, if the length of the mark is less than 3 clock periods, no burst gate pulse is generated. The termination end generator circuit 6 produces the termination end pulse signal 7 of which pulse is assigned to a trailing end of each 1-bit group (shown as e).

The mark/space length detector circuit 8 when detecting a mark or space of 2T length produces respectively a 2-clock-period pulse of the 2T mark signal 9 which comprises a start end pulse 102 and a termination end pulse 103 (shown as f) or a 4-clock-period pulse of the 2T space signal 10 which includes two edge pulses 104 and 100 at the start and termination ends of the 2T space (shown as g).

The encoder 11 then identifies attributes of the start end pulse signal 3 and the termination end pulse signal 7 from the 2T mark signal 9 and the 2T space signal 10 to deliver the select signal 12. It is assumed that the attributes are classified to four distinct types: normal in which both the mark and the space are not shorter than 3T, 2Ts in which the mark is not shorter than 3T but the space equals 2T, 2Tm in which the space is not shorter than 3T but the mark is 2T, and 2Ts–2Tm in which both the mark and the space are equal to 2T. For example, the start end pulse 100 shown in FIG. 3 falls in 2Ts, the termination end pulse 101 stays in normal, the start end pulse 102 falls in 2Tm, and the termination end pulse 103 is defined by 2Ts–2Tm (shown in h).

According to the select signal 12, the start end selector 14 selects corresponding one from the start end position data 13, that is, respective start end positions in normal duration, in 2Ts duration, in 2Tm duration, and in 2Ts–2Tm duration, which is then transferred as the selected start end position data 15. The start end sample/hold circuit 16 performs updating upon receiving the start end pulse signal 3 but holds a preceding piece of data when no start end pulse signal is loaded, and delivers a held start end position data 36 (shown as i). The start end programmable delay line 17 delays the start end pulse signal 3 by a delay time determined by the hold start end position data 36 in order to deliver the delayed start end pulse signal 18 (shown as j).

Similarly, the termination end selector 20 selects one of the termination end position data 19 according to the select signal 12 and transmits the selected termination end position data 19, as the selected termination end position data 21 to the termination end sample/hold circuit 22 which performs updating upon receipt of the termination end pulse signal 7 but otherwise holds the preceding piece of data and delivers the hold termination end position data 35 (shown as k). The termination end programmable delay line 23 retards the start end pulse signal 3 by a delay time determined by the hold termination end position data 35 in order to deliver the delayed termination end pulse signal 24 (shown as 1).

The AND gate 26 calculates a logic product from the burst gate signal 5 and the clock signal 25 to generate the burst signal 27 (shown as m). The OR gate 28 determines a logic sum of the delayed start end pulse signal 18, the burst signal 27, and the delayed termination end pulse signal 24 to produce the recording signal 29 (shown as n).

In response to the recording signal 29, the laser diode driver circuit 30 creates the laser beam 31 of binary format whose intensity is modulated to the two, recording and erasing, powers corresponding to binary data of the recording signal 29. The laser beam 31 is focused by the optical head 32 to a spot of irradiation to form the row of marks and spaces (shown as o) on a surface of the phase-change optical disk 33 which is rotated by the spindle motor 34.

As described, the disk data recording apparatus of the present invention is capable of recording the row of marks and spaces corresponding to the data 1 while dislocating the start and termination ends of the mark defined by its length and the lengths of the two neighboring spaces before and after the mark. In this embodiment, dislocation of positions of edges of the mark is implemented by comparing the shortest 2T marks and spaces with reference length. It may be done with more accuracy when the second shortest marks and spaces of 3T long are similarly detected and used for the dislocation of edge positions in addition.

Figure 4:
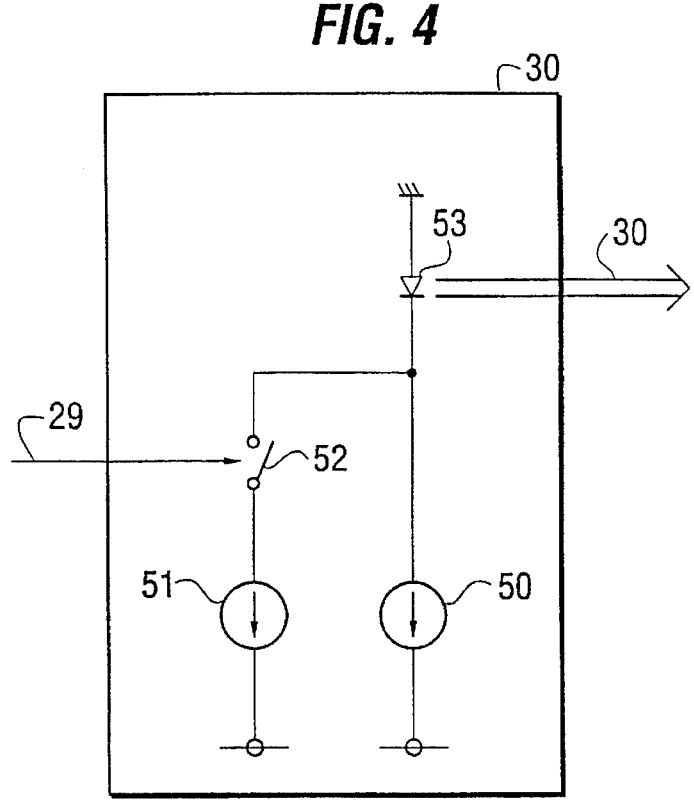
FIG. 4 is a schematic view of a first example of a laser diode driver circuit.

Two preferred arrangements of the laser diode driver circuit 30 is explained as follows. FIG. 4 is a schematic view of a first example of the laser diode driver circuit 30 employing an n-type laser diode 53. The n-type laser diode 53 has an anode grounded and is driven by a combination of a main current source 50 and a sub current source 51 coupled in parallel. The main current source 50 supplies the laser diode 53 with a current for emission of the erasing power and the sub current source 51 and the main current source 50 provide a current the main current source 50 for emission of the recording power. The sub current source 51 is connected and disconnected by on/off action of a switch 52 activated by the recording signal 29, thus providing two-level currents to the laser diode 53. A resultant laser beam 31 outputted from the laser diode driver circuit is directed to the optical head 32 for recording.

Figure 5:
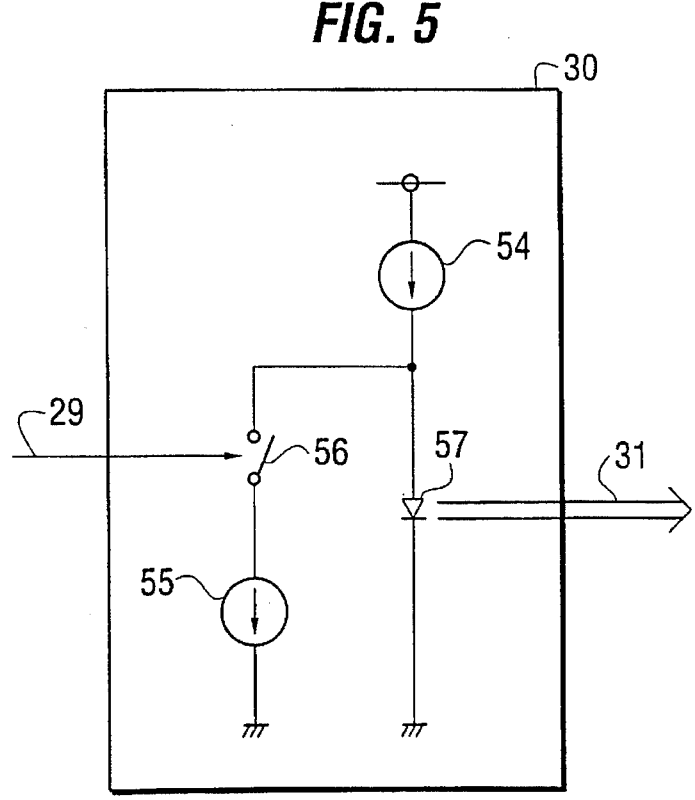
FIG. 5 is a schematic view of a second example of the laser diode driver circuit.

FIG. 5 is a schematic view of a second example of the laser diode driver circuit 30 in which a p-type laser diode 57 has a cathode grounded and is driven by a main current source 54. While a current output of the main current source 54 actuates the laser diode 57 for the emission of the recording power, its portion is drained out through a sub current source 55 to allow the laser diode 57 to generate the erasing power. With the sub current source 55 being connected and disconnected by the on/off action of a switch 56 conducted by the recording signal 29, a current to the laser diode 57 is modulated to two levels. The current output of the main current source 54 for the emission of the recording power is reduced by a current value of the sub current source 55 to allow the laser diode 57 to emit the erasing power. A resultant laser beam 31 of the binary form is transmitted to the optical recording head 32.

Figure 6:
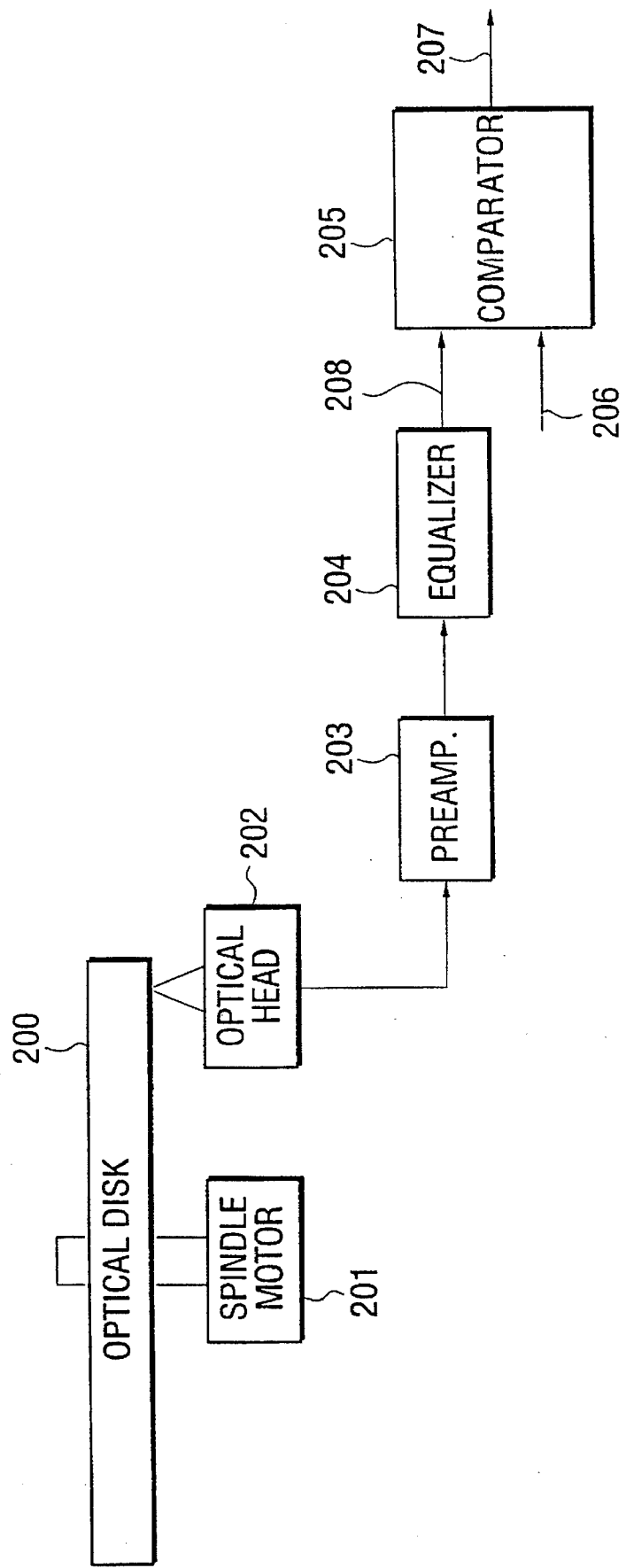
FIG. 6 is a block diagram of a disk data reproducing apparatus showing another embodiment of the present invention.

FIG. 6 illustrates a disk data reproducing apparatus of another embodiment of the present invention for reproducing a reproduced signal from the data recorded on the disk.

As shown, there are provided a disk 200 on which the data are recorded, a spindle motor 201 for rotation of the disk 200, an optical head 202 for scanning the disk 200 to produce the reproduced signal, a preamplifier 203 for amplifying the reproduced signal, an equalizer 204 for compensating for the frequency characteristic of the reproduced signal, and a comparator 205 for binarizing the reproduced signal 208 with using of a slice level voltage 206 to construct a reproduced data 207 are provided.

The reproduced signal 208 and the reproduced data 207 shown in FIG. 6 are as denoted by p and q in FIG. 3 respectively. According to the another embodiment, the reproduced data 207 (shown as q) has the same waveform as of the data 1 (shown as a). The frequency characteristic of the equalizer 204 can offer a flat response and preferably, may be arranged so as to correct for the frequency characteristic of which decrease at a high frequency in a disk data reproduction system for minimizing the edge shift and to vary the frequency distribution of noise contained in the reproduced signal 208 for increasing the S/N ratio and then decreasing the error rate. It is, however, not easy to have such an equalizer with two improvements: reduction in the edge shift and increase in the S/N ratio.

The disk data recording apparatus of the present invention is capable of assigning the start end position data 13 and the termination end position data 19 to optimum values which match the frequency characteristic of the disk data reproducing apparatus. Accordingly, since the equalizer 204 provides the frequency characteristic for ensuring an optimum S/N ratio of the reproduced signal, the edge shift is compensated for by the disk data recording apparatus of the one embodiment. As the result, the start end position data and the termination end position data of the marks and the spaces to be reproduced can be detected at high accuracy with a minimum of noise jitter.

Figure 7:
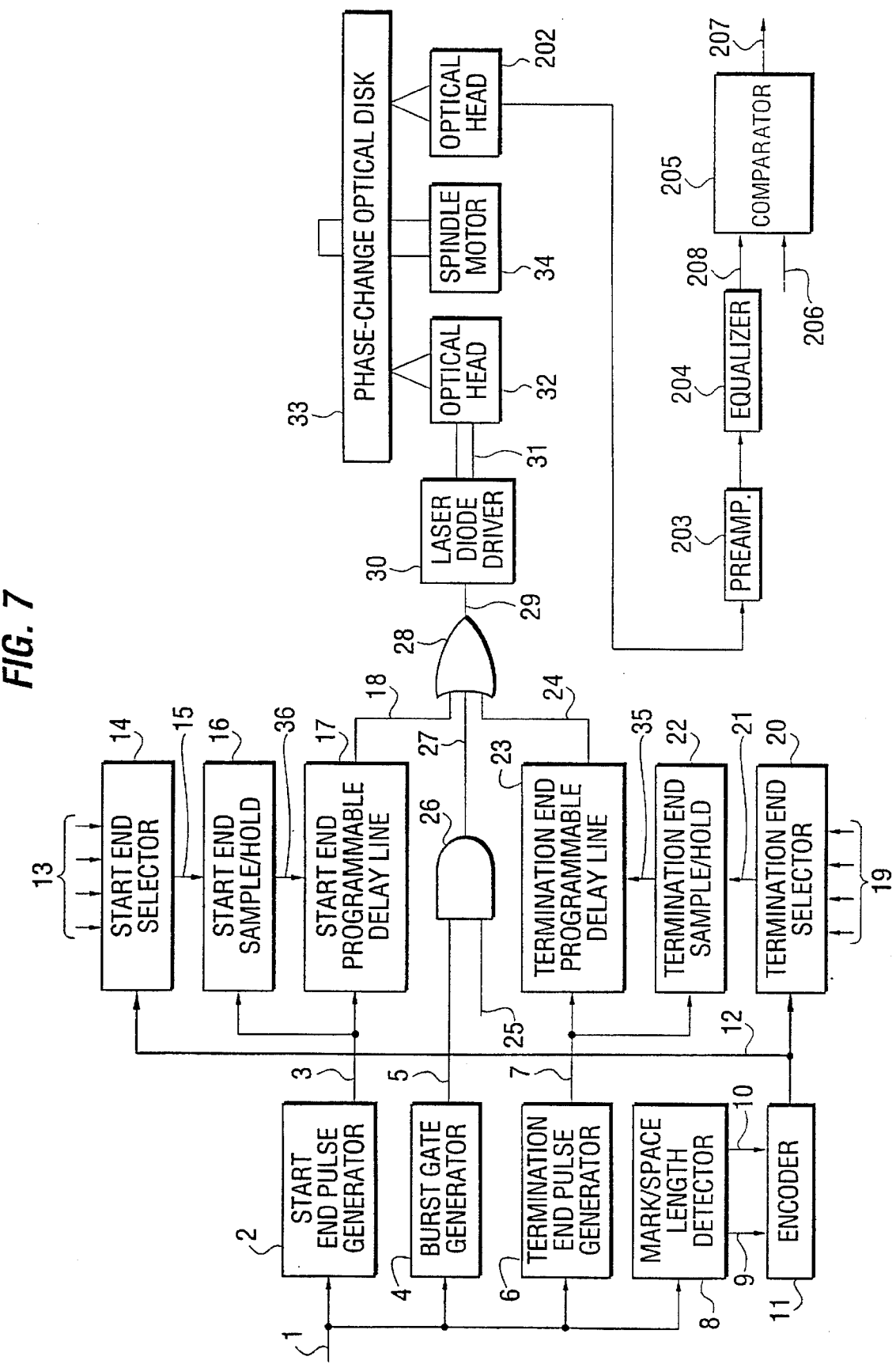
FIG. 7 is a block diagram of a disk data recording/reproducing apparatus showing a further embodiment of the present invention.

A disk data recording/reproducing apparatus of the present invention is described as follows. FIG. 7 is a block diagram of the disk data recording/reproducing apparatus in which components in FIG. 7 are identical to those of the previous embodiments shown in FIGS. 2 and 6 and they and their functions will not be explained in more detail. As apparent, the disk data recording apparatus and the disk data reproducing apparatus of the two previous embodiments are combined together so that the data can be recorded on and reproduced from the optical disk. It is possible to perform the recording and reproducing actions separately or simultaneously. The optical record head 32 and the optical reproduction head 202 may be replaced by a single record/reproduction head which does not allow the recording and reproducing actions to be carried out at the same time.

Although the rewritable optical disk in the embodiments is a phase-change disk, it may be a magneto-optic disk. It is preferred to carry out optical modulation recording on such magneto-optic disk using two different laser beams of binary form: recording power and zero or reproducing power. The width of the start or termination end pulse is not limited to a period of a clock pulse. It is advantageous to have a pulse width of any relevant signal equal to the period of the clock pulse because such pulses are readily generated with a conventional synchronizing circuit which contributes to the minimum size of a circuitry arrangement. With a similar reason, the pulse width of the burst signal is preferably ½ the period of the clock pulse since it can be produced directly from the clock signal.

What is claimed is:

1. A disk data recording method for recording an input data at a data clock signal having a specific clock period on a disk recording medium in a form of position information of leading and trailing edges of marks with a laser beam, the input data being composed of alternately occurring mark data parts and space data parts, said method comprising the steps of:

generating a mark start end pulse for a predetermined period at a start end of a mark data part of the input data;

generating a mark termination end pulse for the predetermined period at a termination end of the mark data part;

generating a train of intermediate pulses occurring at equal intervals of a predetermined duration;

arranging in order the mark start end pulse, the train of intermediate pulses and the mark termination end pulse to obtain a recording signal;

driving a laser beam source according to the recording signal to produce a laser beam whose power becomes a first power for the predetermined period at a portion corresponding the mark start end pulse and at a portion corresponding to the mark termination end pulse and becomes the first power and a second power alternately at equal intervals of the predetermined duration at a portion corresponding to the train of intermediate pulses; and irradiating the disk recording medium with the laser beam to form a mark, wherein said method further comprises a step of determining a position of the mark start end pulse according to both a length of a space data part immediately before the mark data part and a length of the mark data part.

2. A method according to claim 1, wherein said step of determining the position of the mark start end pulse includes delaying the position of the mark start end pulse when the length of the space data part immediately before the mark data part and the length of the mark data part are shorter than a predetermined length, and maintaining the position of mark start end pulse when the length of the space data part immediately before the mark data part and the length of the mark data part are not shorter than the predetermined length.

3. A method according to claim 1, further comprising a step of determining a position of the mark termination end pulse according to both a length of a space data part immediately after the mark data part and the length of the mark data part.

4. A method according to claim 3, wherein said step of determining the position of the mark termination end pulse includes delaying the position of the mark termination end pulse when the length of the space data part immediately after the mark data part and the length of the mark data part are shorter than a predetermined length, and maintaining the position of mark termination end pulse when the length of the space data part immediately after the mark data part and the length of the mark data part are not shorter than the predetermined length.

5. A method according to claim 1, wherein the predetermined period is substantially equal to the clock period and the predetermined duration is substantially equal to ½ the clock period.

* * * * *